United States Patent
Carpenter et al.

(10) Patent No.: US 10,255,370 B2
(45) Date of Patent: Apr. 9, 2019

(54) AUTOMATED COMPLIANCE CHECKING THROUGH ANALYSIS OF CLOUD INFRASTRUCTURE TEMPLATES

(71) Applicant: Raytheon Company, Waltham, MA (US)

(72) Inventors: Nathan T. Carpenter, Severn, MD (US); Daniel A. Nagle, Glenwood, MD (US); Ivor L. Brown, Centreville, MD (US)

(73) Assignee: Raytheon Company, Waltham, MA (US)

( * ) Notice: Subject to any disclaimer, the term of this patent is extended or adjusted under 35 U.S.C. 154(b) by 377 days.

(21) Appl. No.: 15/216,999

(22) Filed: Jul. 22, 2016

(65) Prior Publication Data

US 2017/0026416 A1 Jan. 26, 2017

Related U.S. Application Data (60) Provisional application No. 62/196,344, filed on Jul. 24, 2015.

(51) Int. Cl.
*G06F 15/173* (2006.01)
*G06F 17/30* (2006.01)
*H04L 12/24* (2006.01)
*H04L 29/08* (2006.01)

(52) U.S. Cl.
CPC .. *G06F 17/30867* (2013.01); *G06F 17/30958* (2013.01); *H04L 41/0866* (2013.01); *H04L 41/0893* (2013.01); *H04L 41/12* (2013.01); *H04L 67/104* (2013.01)

(58) Field of Classification Search
CPC ... H04L 67/104; H04L 41/0866; H04L 41/12; H04L 41/0893; G06F 17/30958; G06F 17/30867
USPC .......................................................... 709/223
See application file for complete search history.

(56) References Cited

U.S. PATENT DOCUMENTS

| | | | |
|---|---|---|---|
| 9,621,428 B1* | 4/2017 | Lev .......................... | H04L 41/12 |
| 2011/0276890 A1* | 11/2011 | Jensen-Home ........ | G06F 9/5061 |
| | | | 715/738 |
| 2012/0266209 A1* | 10/2012 | Gooding ................. | H04L 63/20 |
| | | | 726/1 |

* cited by examiner

*Primary Examiner* — Frantz B Jean
(74) *Attorney, Agent, or Firm* — Schwegman Lundberg & Woessner, P.A.

(57) ABSTRACT

Systems and methods for determining a state of an information technology (IT) environment are disclosed. A server accesses an infrastructure-as-code (IaC) template for the IT environment, where the IT environment is virtualized and cloud-based. The server deconstructs, using a parser for the IaC template, the IaC template to a graph database representation of the IT environment, wherein the graph database representation implements a predefined cloud resource ontology (CRO). The server determines, using the graph database representation, the state of the IT environment. The server provides, as a digital transmission, an output corresponding to the determined state of the IT environment.

20 Claims, 5 Drawing Sheets

AUTOMATED COMPLIANCE CHECKING THROUGH ANALYSIS OF CLOUD INFRASTRUCTURE TEMPLATES

RELATED APPLICATION

This application claims priority to U.S. Provisional Patent Application No. 62/196,344, filed on Jul. 24, 2015, and titled "AUTOMATED COMPLIANCE CHECKING THROUGH STATIC ANALYSIS OF CLOUD INFRASTRUCTURE TEMPLATES," the entire content of which is incorporated herein by reference.

TECHNICAL FIELD

Embodiments pertain to providing secure communications. Some embodiments relate to encryption mechanisms and devices that provide encryption.

BACKGROUND

In recent years, internet technology has become very popular. The internet is now used by many individuals, businesses, educational institutions, and government organizations. With the explosion of internet usage, however, a number of issues have arisen. One issue that has arisen is the security of data. Nowhere has this become more apparent than with the use of cloud-based services. Cloud services provide network-shared and dynamically allocated computational resources for data storage and processing. However, the efficiencies gained through the use of the cloud may be at least partially offset by security risks of one or more of the networked resources. While private companies may be able to afford such risks, public entities such as the government may desire a higher level of security.

Current authentication and accreditation processes (such as those for Intelligence Community Directive 503 for information technology systems security risk management, certification and accreditation) are manual and cumbersome. It would be desirable to provide authentication and accreditation processes having the elasticity or fluidity sufficient for modern cloud environments.

BRIEF SUMMARY OF THE INVENTION

Some aspects relate to a system for determining a state of an information technology (IT) environment, the system comprising: processing circuitry and memory; the processing circuitry to: access an infrastructure-as-code (IaC) template for the IT environment, wherein the IT environment is virtualized and cloud-based; deconstruct, using a parser for the IaC template, the IaC template to a graph database representation of the IT environment, wherein the graph database representation implements a predefined cloud resource ontology (CRO); determine, using the graph database representation, the state of the IT environment; and provide, as a digital transmission, an output corresponding to the determined state of the IT environment.

Some aspects relate to a non-transitory machine-readable medium for determining a state of an information technology (IT) environment, the machine-readable medium comprising instructions that, when executed by one or more processors of a machine, cause the one or more processors to carry out operations comprising: accessing an infrastructure-as-code (IaC) template for the IT environment, wherein the IT environment is virtualized and cloud-based; deconstructing, using a parser for the IaC template, the IaC template to a graph database representation of the IT environment, wherein the graph database representation implements a predefined cloud resource ontology (CRO); determining, using the graph database representation, the state of the IT environment; and providing, as a digital transmission, an output corresponding to the determined state of the IT environment.

Some aspects relate to a method for determining a state of an information technology (IT) environment, the method comprising: accessing an infrastructure-as-code (IaC) template for the IT environment, wherein the IT environment is virtualized and cloud-based; deconstructing, using a parser for the IaC template, the IaC template to a graph database representation of the IT environment, wherein the graph database representation implements a predefined cloud resource ontology (CRO); determining, using the graph database representation, the state of the IT environment; and providing, as a digital transmission, an output corresponding to the determined state of the IT environment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
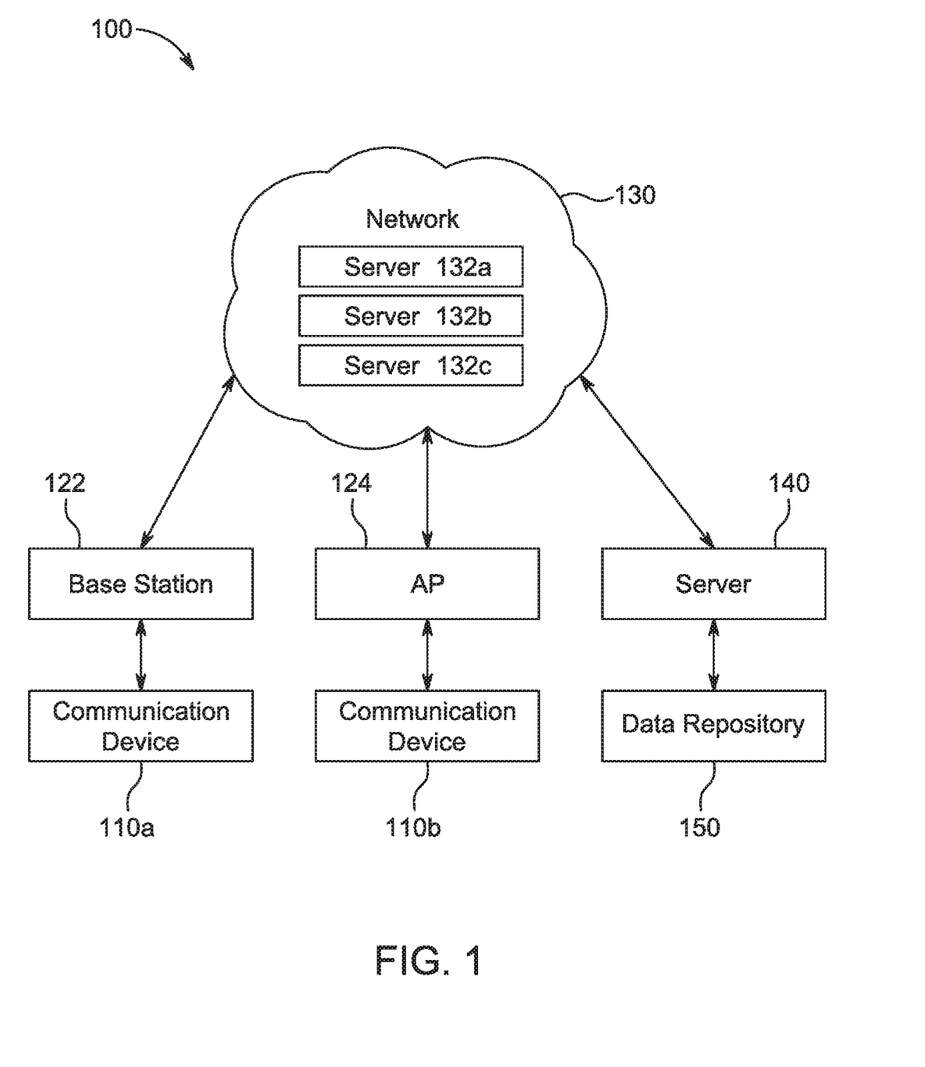
FIG. 1 is a functional block diagram illustrating a communication system, in accordance with some embodiments.

FIG. 1 is a functional block diagram illustrating a communication system 100 in accordance with some embodiments. FIG. 1 is a functional block diagram illustrating one embodiment of the network-based communication system 100 in which communication devices 110a, 110b obtain cloud services using servers 132a, 132b, 132c in the network 130. The communication devices 110a, 110b may communicate with the network 130 wirelessly, through a base station (BS) 122, or through a wired (or wireless) access point (AP) 124. The BS 122 or the AP 124 may include an evolved NodeB (eNB). The communication devices 110a, 110b may communicate using any of a number of different local communication techniques, such as WiFi, Bluetooth or Zigbee, among others and/or remote communication techniques with the network 130 via Third Generation Partnership Project Long Term Evolution (3GPP LTE) networks and LTE advanced (LTE-A) networks, $4^{th}$ generation (4G) networks or $5^{th}$ generation (5G) networks. Examples of communication devices 110a, 110b include, but are not limited to, mobile devices such as portable handsets, smartphones, tablet computers, laptop computers, wearable devices, and sensors. The servers 132a, 132b, 132c may provide audio and/or video content, processing or support for applications running on the communication devices 110a, 110b. The server 140 may provide processing capabilities to receive, test, and report on a template, as described in more detail below. According to some examples, the server 140 implements the methods discussed below in conjunction with FIG. 4 and/or FIG. 5. As shown, the server 140 is coupled with a data repository 150. The data repository 150 stores data for use by the server in receiving, testing, and reporting on the template. According to some examples, the data repository 150 may be a database, for instance, a graph database.

As used herein, the phrase "cloud services" encompasses its plain and ordinary meaning. A cloud service may include any resource that is provided over a network, such as the Internet. According to some examples, cloud services may include, among other things, software as a service (SaaS), platform as a service (PaaS), and infrastructure as a service (IaaS).

Some aspects of the subject technology address the problem in the computer arts of determining a state of an information technology (IT) environment, where the IT environment is virtualized and cloud-based. The state may include information about compliance with a security policy or a resource usage policy, information about changes to the IT environment, or other user-provided queries about the IT environment. According to some implementations, the solution to the problem of determining the state of the IT environment includes accessing an infrastructure-as-code (IaC) template for the IT environment. The solution also includes deconstructing, using a parser for the IaC template, the IaC template to a graph database representation of the IT environment. The graph database representation implements a predefined cloud resource ontology (CRO), as discussed in greater detail below. The solution also includes determining, using the graph database representation, the state of the IT environment. The determined state of the IT environment may be provided as a digital transmission, for example, via email, push notification, short messaging service (SMS), web browser or other application, and the like.

According to some implementations, the solution above is implemented at the server 140, and the graph database resides in the data repository 150. The IT environment includes the servers 132a, 132b, and 132c of the network 130 and any virtualized and cloud-based data residing thereon.

Figure 2:
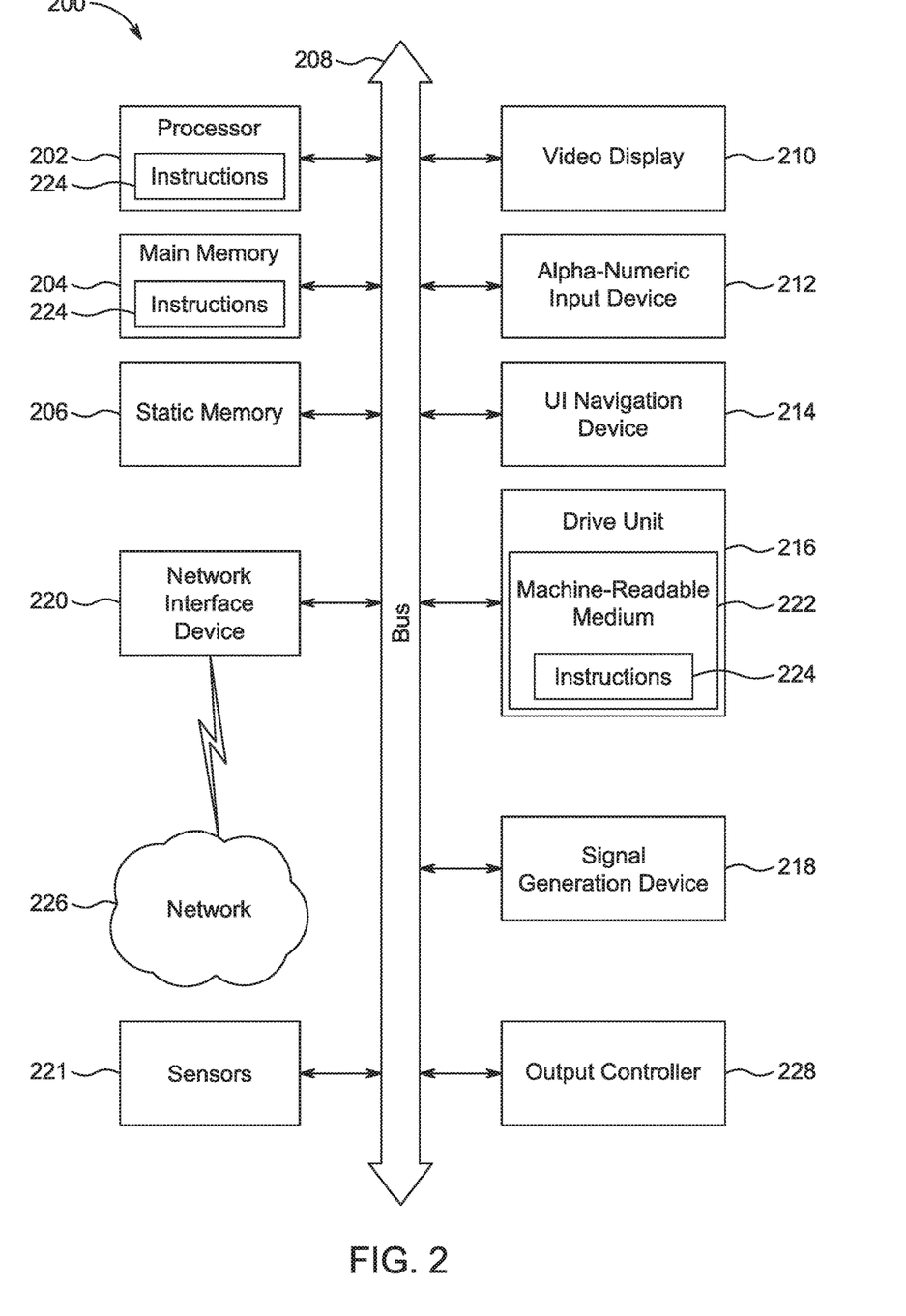
FIG. 2 is a block diagram of a wireless device, in accordance with some embodiments.

FIG. 2 illustrates a block diagram of a communication device in accordance with some embodiments. In some embodiments, the communication device 200 may be one of the communication devices 110a, 110b or server 140 shown in FIG. 1, and may be a computer configured to perform any one or more of the techniques discussed herein. In alternative embodiments, the communication device 200 may operate as a standalone device or may be connected (e.g., networked) to other computers. In a networked deployment, the communication device 200 may operate in the capacity of a server, a client, or both in server-client network environments. In an example, the communication device 200 may act as a peer machine in peer-to-peer (P2P) (or other distributed) network environment. In this document, the phrases P2P, device-to-device (D2D) and sidelink may be used interchangeably. The communication device 200 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), memory 204 and a static memory 206, some or all of which may communicate with each other via an interlink (e.g., bus) 208. Although not shown, the main memory 204 may contain any or all of removable storage and non-removable storage, volatile memory or non-volatile memory. The communication device 200 may further include a video display unit 210 (or other display unit), an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The communication device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 216 (e.g., a storage device) may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the communication device 200. In an example, one or any combination of the hardware processor 202, the main memory 204, the static memory 206, or the storage device 216 may constitute machine readable media.

While the machine readable medium 222 is illustrated as a single medium, the term "machine readable medium" may include a single medium or multiple media e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226.

As above, modern software development has been reshaped by the emergence of Infrastructure-as-a-Service (IaaS) through virtualization and cloud technologies. IaaS provides provisioning of computational, network, and storage resources on-demand by developers, and allows teams using automated stacks of software to deploy to production multiple times per day. Generally a data structure encoded in a file may be sent to an IaaS platform to create the environment on-demand. Governance processes, however, especially security-related ones, are challenged to keep up with this pace. To this end, parsing of cloud infrastructure templates, followed by ingestion, analysis and alerting of security relevant events may allow for modern cloud technologies to be utilized while still maintaining the appropriate certification process.

In particular, static analysis techniques may be used on a graph-based representation of the cloud template to determine correctness, changes from previous instances, deviations from approved versions, compliance with defined policies, and other potential issues or risks. Using modern DevOps tools, this functionality is performed automatically at code check-in time or any stage in the build, test, and deployment process. This automated inspection allows for repeatable certification, accreditation, and governance analysis while allowing developers to maintain their pace of production and simultaneously decreasing the chance of issues or violations being introduced into a production environment.

Figure 3:
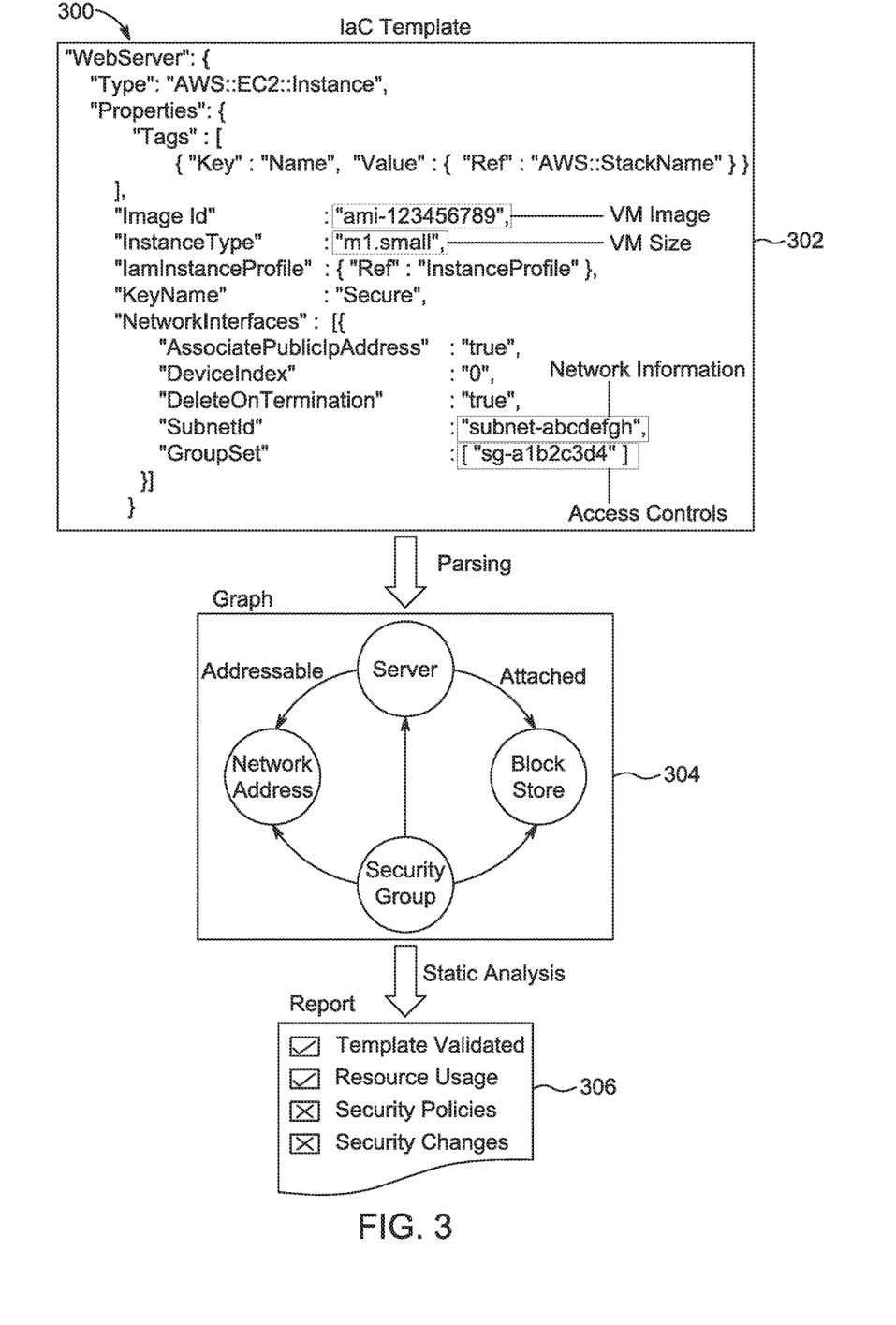
FIG. 3 is a block diagram of a process flow of providing a report, in accordance with some embodiments.

FIG. 3 illustrates a block diagram of a process flow 300 of providing a report in accordance with some embodiments. As shown in FIG. 3, developers may use "Infrastructure-as-Code" (IaC) to specify and create an IT environment. In particular, an IaC template 302 may be parsed, a graphical representation 304 generated, and a static analysis report 306 generated using static analysis. IaC encodes the parameters of a specific IT in a template that enables the IaaS platform to create an environment on-demand. A portion of an example template is shown in the IaC template 302 of FIG. 3. As shown, the IaC template 302 lists several fields to the left of the colon (:) and values for those fields to the right of the colon. These fields and values are parsed and represented as a graph 304 (e.g., by the server 140), which may be stored as a graph database in the data repository 150.

The graph 304 is created by deconstructing the IaC template 302 and mapping the IaC template 302 onto the CRO. In the graph 304, each circle represents a row in the IaC template 302, and information or attributes associated with the row are written inside the circle. In summary, the graph 304 includes similar information to the IaC template 302, but in a different format.

After creation of the graph 304, static analysis is applied (e.g., by the server 140) to the graph 304 to obtain the report 306. The report 306 may be based on custom software (e.g., Java) code that allows a user to query based on specific system parameters provided by the user. For example, the user may create his/her own rules and query for adherence, by the IT environment associated with the IaC template 302, to those rules. The rules may include ports being opened or closed, firewall rules, software being or not being stored in the IT environment, user-role relationships, and the like. The report 306 may notify the user whether the IT system adheres to those rules.

Upon detecting non-adherence to one or more rules, a machine implementing the subject technology (e.g., server 140) publishes an event to a queue. A user may subscribe to the queue and, thus, be notified of the non-adherence. Alternatively, a user may run an ad hoc query to check for adherence to the rules at an arbitrary time. In some cases, the machine implementing the subject technology notifies the user of non-adherence to rules, and relies on other machines to change the system such that adherence to the rules is enforced. According to some examples, rules are created and managed via Drools Rule Engine, developed by Red Hat, Inc., of Raleigh, N.C.

In some examples, the report 306 may compare one version of the graph 304 (e.g., a current version) to a previous version, noting which changes were made. The user may review the report to confirm that the changes are desirable.

Templates may be easier to read, use and maintain than manual processes and specialty scripts, empowering all project resources (not just systems administrators) to create and manage the project infrastructure. In addition, templates may be placed under configuration management along with the code designed to run on the environment, enabling inexpensive snapshotting and repeatable re-creation of any version of the environment and the production code. The templates may dramatically enhance the process of Continuous Integration/Continuous Deployment (CI/CD) by enabling automated creation of development, test, and production environments during each build-test-deploy cycle, reducing times from code check-in to production deployment. Moreover, IaaS represents a major challenge in organizations with strong policy and compliance constraints on IT, since developers and automated processes can create and destroy IT environments on-demand. Analyzing templates may enable automated checking of a project's IT infrastructure against a set of policies to determine policy and security compliance prior to deployment.

As above, templates are rich, complex, and evolving data structures. It is thus desirable to represent them thoroughly and flexibly. Templates may be used for sizable systems and include specifications reflecting many hundreds or thousands of resources with complex dependencies and interrelationships. Each IaaS provider has different resources available and has their own syntax to describe their resources. Thus, different policies may evolve for dealing with each IaaS provider. Representing the template as a directed graph may yield multiple benefits, including increasing the ease of manipulation and comparison, both visually and by machine, increasing schema flexibility without providing predefined relationship models, enabling analysis of large and complex templates due to the high scalability of the system, and collapsing irrelevant sections of the graph, simplifying the analysis process.

In short, graphical representation allows for a highly flexible representation that may not be dependent on any given cloud template schema, and can be analyzed at large scale. DevOps integration allows analysis to occur at one or multiple points in the development and deployment chain. The Cloud Resource Ontology (CRO) is a unique representation that can be enriched from other sources (i.e. security scans) and used for other purposes (i.e. Cyber situational awareness).

Figure 4:
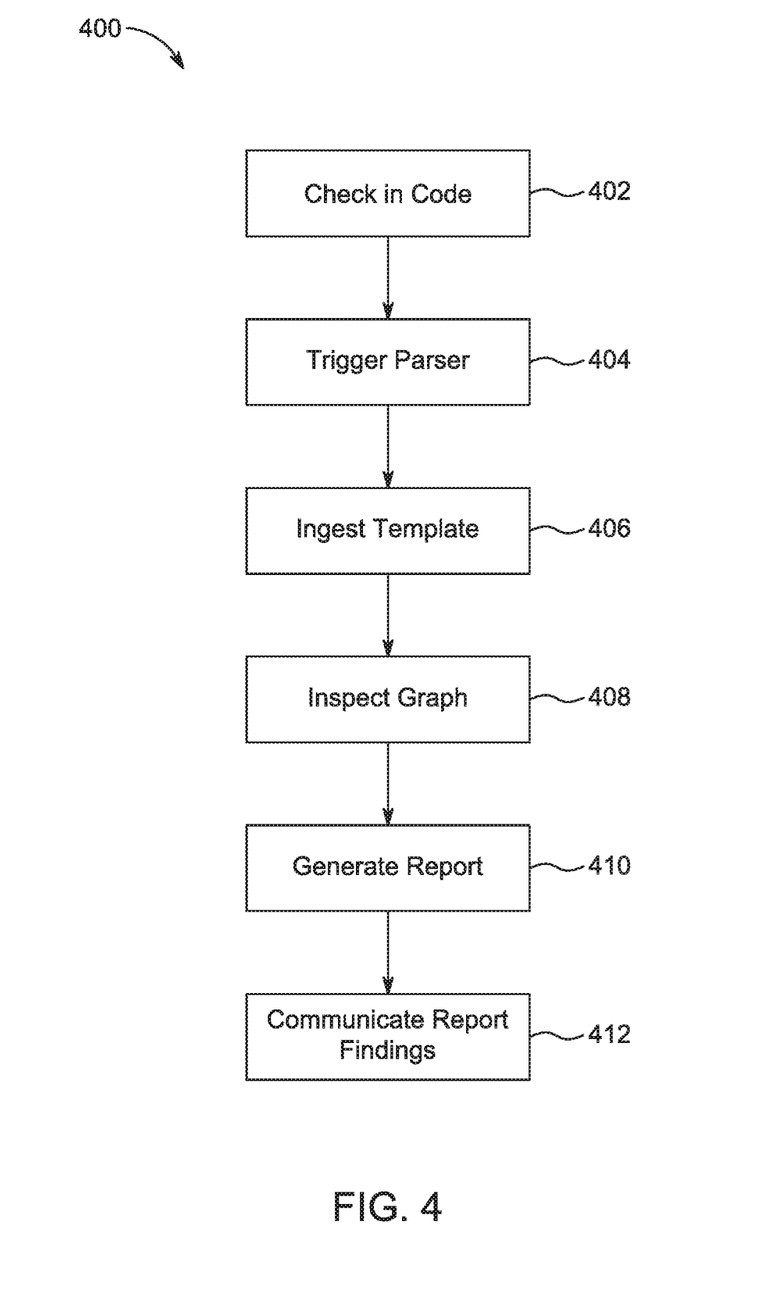
FIG. 4 is a flowchart of a method for providing the report, in accordance with some embodiments.

FIG. 4 illustrates a flowchart of a method 400 providing the report in accordance with some embodiments. The method 400 shown in FIG. 4 may be performed by the server 140 shown in FIG. 1, in some cases in conjunction with other computers and devices. The method 400 begins at operation 402, where a software developer initially checks in code that includes one or more templates into a source code repository. One example of a source code repository is Git, developed by GitHub Enterprise of San Francisco, Calif.

The check in may trigger an automated build tool, which in turn may trigger a custom plugin. One example of the automated build tool is Jenkins, licensed by Massachusetts Institute of Technology License of Cambridge, Mass. The plugin may detect the presence and type of template. Once detected, the plugin may at operation 404 trigger an appropriate parser on the template. At operation 404, the parser is triggered. In some cases, the parser is triggered in conjunction with an automatic build tool.

The parser, in response, at operation 406, may ingest each template and map the template into a Cloud Resource Ontology (CRO). In other words, the parser, which may reside at the server 140, deconstructs the template and places the deconstructed template into the CRO. The parser may convert the contents of the template into an object representation, then create a node-edge representation of the set of objects, and encode properties of the objects into properties of the nodes or edges as appropriate. The parser may store the result in a graph database at operation 406. The graph database may reside in the data repository 150. One example of the graph database is Neo4J, developed by Neo Technology, Inc., of San Mateo, Calif.

More specifically, each valid template may contain one or more resources as defined by the CRO. Examples of resources are Virtual Machines, Subnets, Security Groups, Users, and Virtual Private Clouds. Use of the CRO in a graph construct may permit a flexible schema where new resource types can be added without affecting previously stored entries.

Each resource may have zero or more relationships to other resources. A resource may have zero, one, or many different relationships to another resource. A resource may have the same type of relationships to multiple resources. Use of the CRO in a graph construct permits a flexible schema where new relationship types can be added without affecting previously stored entries.

Each resource and relationship may have one or more uniquely named properties associated with it. Some properties may be required, such as id, type, and version which are required for analysis and change detection. Use of the CRO in a graph construct may thus permit a flexible schema where new properties can be added to a resource or relationship without affecting previously stored entries.

To permit follow-on analysis the parser may maintain a collection of unique identifiers and timestamps that allow extraction of related groups of resources and relationships. For each run, the parser may generate a unique run_id to tag all of its actions, which may provide a simple identification and extraction of the elements of the graph from the Graph Database. It may also use metadata about the code lineage (project name and template source code version) to create other tags.

Any syntax or format errors found in the template may be reported by the parser which may terminate the flow. This object-based representation may then be written into the graph database (e.g., residing in the data repository 150) to be analyzed following the syntax and semantics of the CRO, with each written element tagged with the run_id and other tags representing the parser run and the template under analysis. The parser may reduce, combine, or optimize elements of the graph nodes and edges when writing to the database in order to facilitate analysis.

At operation 408, a CRO analyzer (e.g., residing at the server 140) may inspect the graph (e.g., residing in the graph database of the data repository 150) for potential issues or violations internal to the template itself, against the previous version for security relevant changes, and against an approved baseline template for compliance (e.g., with one or more rules). In more detail, a change to the graph database may trigger the CRO analyzer. The CRO analyzer may use a set of policy specifications and reference templates to perform analysis against the templates loaded into the Graph database by the parser. These specifications may include a Template Compliance Policy, which may specify what resources are permitted or not permitted for a template, and what relationships must exist or may not exist between them. This policy may check a template as a stand-alone entity, Change Compliance Policy, which may specify what changes need to be communicated to the team if they occur between template versions (so that at least two versions of the template may exist in the graph database), and Template Conformance Policy, which may specify a reference template (in the graph database) and what deviations are permitted or denied from the reference.

The CRO analyzer may examine the contents of the graph database generated by the last parser run for template compliance analysis. The CRO analyzer may consume the graph and the Template Compliance Policy specification and pass them through a validator. A rules violation, as indicated below, may result in a warning or a violation. A sample set of rules may include: (i) that the template only contains virtual machine, subnet, security group, and virtual private cloud resources—resulting in a warning, (ii) that the template contains at least one security group resource—resulting in a violation, (iii) that the template contains at least one virtual private cloud resource—resulting in a violation, (iv) that all virtual machine resources have at least one relationship to a security group—resulting in a violation, (v) that all virtual machine resources have at least one relationship to a virtual private cloud—resulting in a violation, (vi) that all subnet resources have at least one relationship to a virtual private cloud—resulting in a violation, and (vii) that all subnet resources have unique Classless Inter-Domain Routing (CIDR) Block Properties—resulting in a warning. As used herein, the phrase "CIDR Block" encompasses its plain and ordinary meaning including, but not limited to, blocks of representation of IP addresses and their routing properties.

A compliant template, taken alone, may still violate policy if changes were introduced that may prove noncompliant. For example, the policy may allow for open ports to the Internet, but only with approval—so a new version of the template that opened a port to the Internet should be flagged for review. The CRO analyzer may examine the contents of the graph database across parser runs for change compliance analysis. To permit rapid analysis at scale, non-relevant portions of the graph may be collapsed and treated as a single resource. If a previous version of this template exists in the graph database, it is compared to the new version for relevant changes, as defined by the policy specification. The Analyzer may generate review notices and report these for follow-on action.

A template may also be compared to a reference template that has been previously loaded into the CRO for compliance. The CRO analyzer may perform template conformance analysis to compare the contents of the graph database with a base template defined in the policy specification. For example, a policy may not allow more than ten virtual machine resources for a particular project, or may enforce a resource naming standard for a given set of projects. These may not result in warnings or violations during either internal compliance analysis, or in review notices during change analysis. This may generate review or violation messages if problems are detected.

At operation 410, the CRO analyzer may generate a report. The report may summarize the warning, violation, and review messages in a format that can be presented to the users, the governance team, and the automated build tool. The report may be transmitted to a user (e.g., an IT professional) by email. SMS, push notification, browser notification, application notification, and the like. The automated build tool may reside at the server 140.

At operation 412, the automated build tool may succeed, warn, or fail based on the report. The automated build tool may generate a message indicating whether it succeeds, warns, or fails. The message may be transmitted by email, SMS, push notification, browser notification, application notification, and the like. The report and subsequent alert may be provided visually or audibly, for example, via the computing device.

In addition, based on the messages in aggregate from the CRO analyzer, the build process can be terminated or continued as configured by the development team. After operation 412, the method 400 ends.

Although the above relates to static analysis, that is analysis based on a predetermined approved baseline template and known cloud systems, dynamic analysis may also be used. In this case, the system (e.g., server 140) may employ continuous inspection and update of data based on active cloud instances and clout management systems to provide alerts to compliance, security, developers, and operators. The dynamic analysis may include an analysis of the database vulnerability to yield indicators and warnings of vulnerabilities in the operating systems, installed software, or network configurations. These can be used from a cyber perspective to understand and improve the defensive posture of a system. Many types of IaaS platforms with associated IaC specifications exist, notably Chef, Puppet, and OpenStack Heat configurations, which are widely used in automation. The system described may work with these specification formats.

The subject technology is described herein in conjunction with static analysis of a cloud-based system. However, in some embodiments, dynamic analysis is also used. In the dynamic analysis embodiments, streaming parsers ingest log data from a log aggregator (e.g., Splunk Log Aggregation, developed by Splunk, Inc., of San Francisco, Calif.) and create dynamic dashboards for manual or automatic analysis. Aspects of the subject technology may provide reverse compliance and multi-source dynamic analysis. Dynamic analysis may be used to ensure physical uniqueness and logical sameness.

Figure 5:
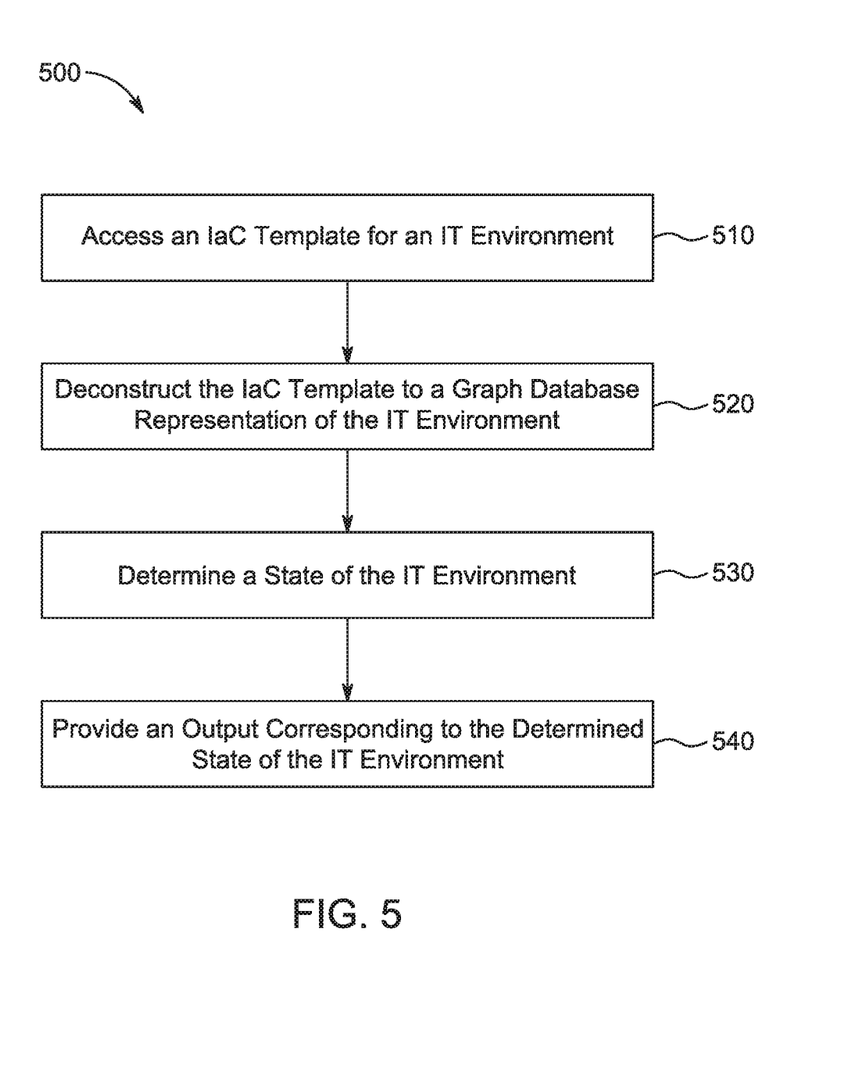
FIG. 5 is a flowchart of a method for determining a state of an information technology environment, in accordance with some embodiments.

FIG. 5 is a flowchart of a method 500 for determining a state of an information technology environment. The method 500 may be implemented at the server 140 of FIG. 1.

The method 500 begins at operation 510, where the server 140 accesses an IaC template for an IT environment (e.g., servers 132a, 132b, 132c). The IT environment is virtualized and cloud-based. According to some examples, the server 140 accesses the IaC template for the IT environment after check-in of the IT environment (or of software code corresponding to the IT environment) and in parallel with building the IT environment.

At operation 520, the server 140 deconstructs the IaC template to a graph database representation of the IT environment. The server 140 may use a parser for the IaC template (e.g., residing on the server 140) to deconstruct the IaC template. The graph database representation implements a predefined cloud resource ontology (CRO). The graph database representation may be stored in the data repository 150.

At operation 530, the server 140 determines, using the graph database representation, a state of the IT environment.

At operation 540, the server 140 provides an output corresponding to the determined state of the IT environment. The output may be provided as a digital transmission (e.g., email, SMS, push notification, browser notification or application notification). After operation 540, the method 500 ends.

In some cases, determining the state of the IT environment includes determining adherence of the IT environment to one or more rules. The output corresponding to the determined state of the IT environment includes an indication whether the IT environment adheres to the one or more rules. The one or more rules may include following a security policy or following a resource usage policy.

In some cases, determining the state of the IT environment includes comparing a first version of the IT environment to a second version of the IT environment. The first version may be a current version and the second version may be a previous version. The output corresponding to the determined state of the IT environment includes an indication of differences between the first version and the second version. The differences between the first version and the second version may include security-related changes between the first version and the second version.

In some cases, determining the state of the IT environment includes receiving a query from a user, the query being based on one or more parameters of the IT environment. The output corresponding to the determined state of the IT environment includes a response to the query.

According to some embodiments, the server 140 includes processing circuitry and memory. The processing circuitry is configured to carry out the steps 510-540 of the method 500 based on instructions (e.g., software) stored in the memory. Alternatively, the instructions may be hard-wired into the processing circuitry. In some cases, the method 500 is carried out using a combination of software instructions stored in memory and hard-wired instructions in the processing circuitry.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for determining a state of an information technology (IT) environment, the system comprising:
   a hardware processor and memory; the hardware processor to:
   access an infrastructure-as-code (IaC) template for the IT environment, wherein the IT environment is virtualized and cloud-based;
   deconstruct, using a parser for the IaC template, the IaC template to a graph database representation of the IT environment, wherein the graph database representation implements a predefined cloud resource ontology (CRO);
   determine, using the graph database representation, the state of the IT environment; and
   provide, as a digital transmission, an output corresponding to the determined state of the IT environment.

2. The system of claim 1, wherein:
   the hardware processor determines the state of the IT environment by determining adherence of the IT environment to one or more rules; and
   the output corresponding to the determined state of the IT environment comprises an indication whether the IT environment adheres to the one or more rules.

3. The system of claim 2, wherein the one or more rules comprise following a security policy or following a resource usage policy.

4. The system of claim 1, wherein:
   the hardware processor determines the state of the IT environment by comparing a first version of the IT environment to a second version of the IT environment; and
   the output corresponding to the determined state of the IT environment comprises an indication of differences between the first version and the second version.

5. The system of claim 4, wherein the differences between the first version and the second version comprise security-related changes between the first version and the second version.

6. The system of claim 1, wherein:
   the hardware processor determines the state of the IT environment by receiving a query from a user, the query being based on one or more parameters of the IT environment; and the output corresponding to the determined state of the IT environment comprises a response to the query.

7. The system of claim 1, wherein:
the hardware processor accesses the IaC template for the IT environment by accessing the IaC template after check-in of the IT environment and in parallel with building the IT environment.

8. A non-transitory machine-readable medium for determining a state of an information technology (IT) environment, the machine-readable medium comprising instructions that, when executed by one or more processors of a machine, cause the one or more processors to carry out operations comprising:
accessing an infrastructure-as-code (IaC) template for the IT environment, wherein the IT environment is virtualized and cloud-based;
deconstructing, using a parser for the IaC template, the IaC template to a graph database representation of the IT environment, wherein the graph database representation implements a predefined cloud resource ontology (CRO);
determining, using the graph database representation, the state of the IT environment; and
providing, as a digital transmission, an output corresponding to the determined state of the IT environment.

9. The machine-readable medium of claim 8, wherein:
determining the state of the IT environment comprises determining adherence of the IT environment to one or more rules; and
the output corresponding to the determined state of the IT environment comprises an indication whether the IT environment adheres to the one or more rules.

10. The machine-readable medium of claim 9, wherein the one or more rules comprise following a security policy or following a resource usage policy.

11. The machine-readable medium of claim 8, wherein:
determining the state of the IT environment comprises comparing a first version of the IT environment to a second version of the IT environment; and
the output corresponding to the determined state of the IT environment comprises an indication of differences between the first version and the second version.

12. The machine-readable medium of claim 11, wherein the differences between the first version and the second version comprise security-related changes between the first version and the second version.

13. The machine-readable medium of claim 8, wherein:
determining the state of the IT environment comprises receiving a query from a user, the query being based on one or more parameters of the IT environment; and
the output corresponding to the determined state of the IT environment comprises a response to the query.

14. The machine-readable medium of claim 8, wherein:
accessing the IaC template for the IT environment comprises accessing the IaC template after check-in of the IT environment and in parallel with building the IT environment.

15. A method for determining a state of an information technology (IT) environment, the method comprising:
accessing an infrastructure-as-code (IaC) template for the IT environment, wherein the IT environment is virtualized and cloud-based;
deconstructing, using a parser for the IaC template, the IaC template to a graph database representation of the IT environment, wherein the graph database representation implements a predefined cloud resource ontology (CRO);
determining, using the graph database representation, the state of the IT environment; and
providing, as a digital transmission, an output corresponding to the determined state of the IT environment.

16. The method of claim 15, wherein:
determining the state of the IT environment comprises determining adherence of the IT environment to one or more rules; and
the output corresponding to the determined state of the IT environment comprises an indication whether the IT environment adheres to the one or more rules.

17. The method of claim 16, wherein the one or more rules comprise following a security policy or following a resource usage policy.

18. The method of claim 15, wherein:
determining the state of the IT environment comprises comparing a first version of the IT environment to a second version of the IT environment; and
the output corresponding to the determined state of the IT environment comprises an indication of differences between the first version and the second version.

19. The method of claim 18, wherein the differences between the first version and the second version comprise security-related changes between the first version and the second version.

20. The method of claim 15, wherein:
determining the state of the IT environment comprises receiving a query from a user, the query being based on one or more parameters of the IT environment; and
the output corresponding to the determined state of the IT environment comprises a response to the query.

* * * * *

UNITED STATES PATENT AND TRADEMARK OFFICE
CERTIFICATE OF CORRECTION

PATENT NO. : 10,255,370 B2
APPLICATION NO. : 15/216999
DATED : April 9, 2019
INVENTOR(S) : Carpenter et al.

Page 1 of 1

It is certified that error appears in the above-identified patent and that said Letters Patent is hereby corrected as shown below:

In the Specification

Column 4, Line 37, before "memory", insert --a main--

Column 5, Line 6, before "e.g.,", insert --(--

Column 8, Line 27, after "analysis", insert --,--

Column 9, Line 55, delete "email." and insert --email,-- therefor

Signed and Sealed this
Twenty-eighth Day of April, 2020

Andrei Iancu
*Director of the United States Patent and Trademark Office*